United States Patent [19]

Bolger et al.

[11] Patent Number: 4,610,129
[45] Date of Patent: Sep. 9, 1986

[54] LAWN MOWER BLADE WITH VARIABLE DEPTH THATCHING DEVICE

[75] Inventors: Robert M. Bolger, Swanton, Ohio; Neil L. Marko, Bloomfield Hills, Mich.

[73] Assignee: Universal Industrial Products Co., a Div. of Core Industries, Inc., Pioneer, Ohio

[21] Appl. No.: 756,997

[22] Filed: Jul. 19, 1985

[51] Int. Cl.⁴ .................. A01D 53/02; A01D 51/00
[52] U.S. Cl. ........................................ 56/17.5; 56/295
[58] Field of Search ............... 56/16.9, 17.5, 16.7, 56/295, 400, 371, 372

[56] References Cited

U.S. PATENT DOCUMENTS

| | | | |
|---|---|---|---|
| 2,871,957 | 2/1959 | Zacharias | 56/16.9 |
| 3,117,633 | 1/1964 | Hosek | 56/295 |
| 3,184,903 | 5/1965 | Fjelstad | 56/17.5 |
| 3,589,112 | 6/1971 | Frohmader | 56/17.5 |
| 3,611,691 | 10/1971 | Howard | 56/295 |
| 3,753,338 | 8/1973 | Sherratt | 56/17.5 |
| 3,916,607 | 11/1975 | Howard | 56/17.5 |
| 3,964,243 | 6/1976 | Knipe | 56/17.5 |
| 4,306,407 | 12/1981 | Danbroth | 56/295 |
| 4,409,781 | 10/1983 | Blackstone | 56/295 |

FOREIGN PATENT DOCUMENTS 2817012 10/1979 Fed. Rep. of Germany ........ 56/295
2011237 7/1979 United Kingdom .................. 56/295

OTHER PUBLICATIONS

Research Disclosure, Feb. 1981.

*Primary Examiner*—Robert Peshock
*Assistant Examiner*—John G. Weiss
*Attorney, Agent, or Firm*—Harness, Dickey & Pierce

[57] ABSTRACT

A combination lawn mower cutting blade and removable thatching devices with the thatching devices being selectively adjustable to vary the depth of thatching relative to the depth of cut of the blade.

8 Claims, 4 Drawing Figures

U.S. Patent  Sep. 9, 1986  4,610,129
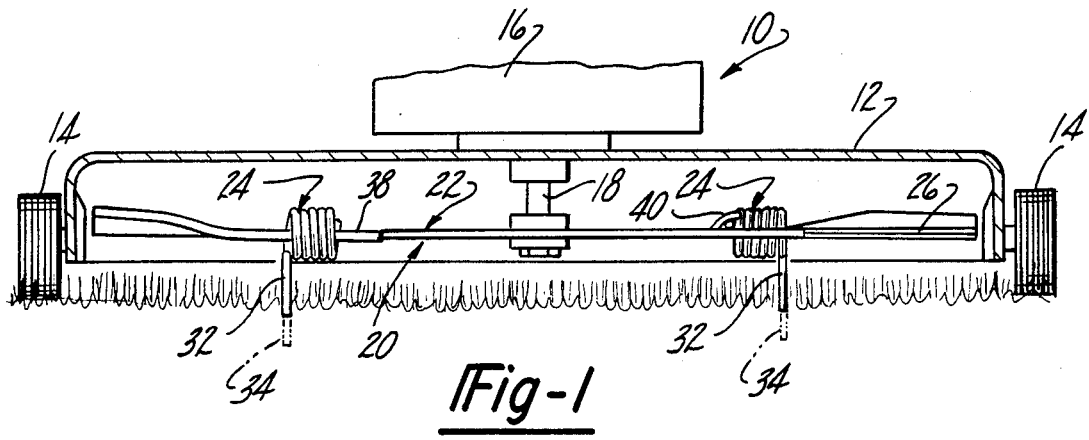
Fig-1
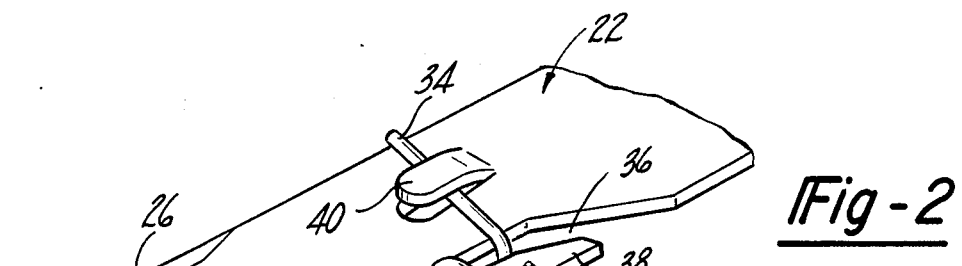
Fig-2
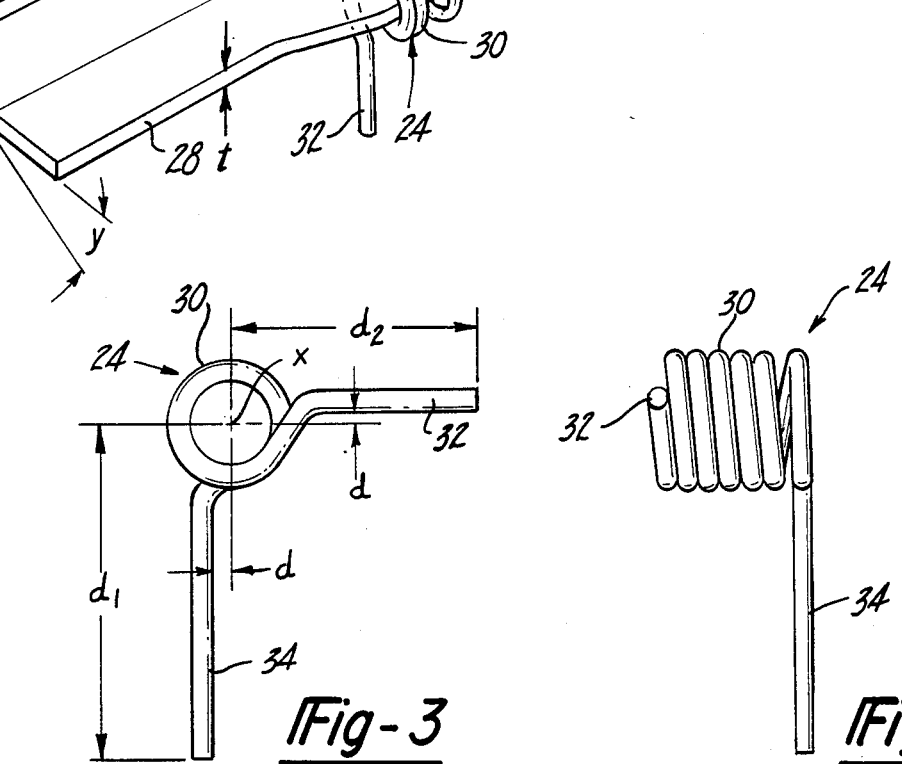
Fig-3
Fig-4

LAWN MOWER BLADE WITH VARIABLE DEPTH THATCHING DEVICE

SUMMARY

BACKGROUND OF THE INVENTION

The present invention relates to a combination lawn mower blade with removable thatching devices and more particularly to such a blade with thatching devices selectively adjustable to vary the depth of thatching.

In lawn care it is desirable from time to time to rake the grass and/or remove the accumulated thatch therefrom. This can most conveniently be done by utilizing a standard rotary power lawn mower with a raking device. Thus it has been known to provide a thatching device, in the form of a coil spring with a depending tine, which is attached to a rotatable bar or cutting blade. Examples of such structures are shown in the U.S. Pat. No. 3,753,338 issued to J. Sherratt on Aug. 21, 1973 and U.S. Pat. No. 3,964,243 issued to E. A. Knipe on June 22, 1976. With such structures the depth of thatching or raking can be varied by varying the height of the bar or cutting blade relative to the grass. When secured to a cutting blade, the combination will act to both cut the grass and thatch. However as the thatching device and associated tine is raised or lowered the depth of cut by the blade is also similarly changed. With prior structures the length of the tine is fixed and hence the distance between the end of the tine and the cutting blade is fixed. Thus to provide deep raking or thatching the blade will be lowered accordingly but the grass, then, may be cut lower than desirable. With the present invention, the thatching device is a coil member which is provided with a pair of tines extending from opposite ends of the coil body. The tines are of different lengths permitting a selective adjustment in the distance between the end of the working tine and the cutting blade simply by reversing the mounting of the coil member on the blade. This allows an accommodation between the desired depth of thatching and depth of grass cut. The latter feature not only provides flexibility of the combination blade for use with different types of grasses but also accommodates thatching a lawn while cutting it at different heights throughout the growing season.

Also in the present invention the non-working tine is used as a hold down leg for the coil assembly.

Thus it is an object of the present invention to provide a unique combination of lawn mower blade and thatching device in which the depth of thatching can be selectively varied relative to the depth of cut of the grass.

It is another general object to provide a unique combination lawn mower blade and thatching device.

Other objects, features, and advantages of the present invention will become apparent from the subsequent description and the appended claims, taken in conjunction with the accompanying drawing, in which:

FIG. 1 is a front elevational, fragmentary view with some parts shown in section of a conventional rotary power lawn mower with a combination blade and thatching device exemplifying features of the present invention;

FIG. 2 is a fragmentary pictorial view of the cutting end of the blade of FIG. 1 with the thatching device attached;

FIG. 3 is a side elevational view to increased scale of the thatching device of FIGS. 1 and 2; and FIG. 4 is a front elevational view of the thatching device of FIG. 3.

Looking now to FIG. 1 a conventional rotary, power lawn mower 10 is partially shown and includes a housing or deck 12 supported upon wheels 14. An engine 16 is adapted to rotationally drive an output shaft 18 to which is secured the combination cutting blade and thatcher 20 of the present invention. The combination blade 20 includes a cutting blade 22 and a pair of thatching devices 24 located near the opposite ends of the blade 22. The combination blade 20 can be raised or lowered relative to the wheels 14, and hence relative to the surface to be cut or thatched, by well known means conventionally provided with power mowers such as lawn mower 10; since details of the latter do not constitute a part of the present invention, they have been omitted for purposes of simplicity.

The cutting blade 22 is in the shape of a generally flat rectangular bar which terminates at each end and on alternate sides in a cutting edge 26. In one form of the present invention, the cutting edges 26 extend for between around 3" to around 3.5". The edges opposite the cutting edges 26 are bent upwardly to define vanes 28. In one form of the present invention the effective portions of the vanes 28 also extend for between around 3" to around 3.5". The noted dimensions are related to blades having a total overall length of between around 18" to around 20". Thus the cutting edges 26 and vanes 28 extend inwardly from the ends of the blade 22 for a distance of between around 30% to around 40% of the distance from those ends to the midpoint of the blade 22.

The angulation of the vanes 28 is selected to provide a fan like effect for discharging the grass clippings and debris picked up through thatching. With conventional blades used for cutting only, the angle Y of the vanes 28 relative to the plane of the remainder of the blade has been around 30°; however, with the combination blade 20 of the present invention, the angle Y was selected to be between around 45° and around 50° to assist in effectively discharging the heavy debris resulting from the action of the thatching devices 24.

The thatching devices 24 are in the form of coil springs having a coiled spring body 30 terminating at its opposite ends in a pair of legs or tines 32 and 34; the tines 32 and 34 are generally straight and extend generally in quadrature or at right angles with each other. As can be seen in FIG. 3, the coil body 30 has an axis X with the tines 32 and 34 offset from each other and away from the axis by a distance "d". The distance "d" is less than the thickness "t" of the blade 22 and facilitates clamping the devices 24 to the blade 22 in a manner to be described.

The blade 22 is provided with partially angulated notches 36 on the same side edges as the vanes 28. The notches 36 define tongues 38 each of which has a width slightly less than the diameter of the opening through the coil body 30. The notches 36 and associated tongues 38 are formed in the flat part of the blade 22 immediately adjacent to the vanes 28. An upwardly extending tab 40 is formed in the body of the blade 22 generally in alignment, width wise, with the non-tapered portion of the tongue 38. In operation the coil body 30 is inserted over the tongue 38 via the notch 36. In this condition, and as shown in the drawings, one of the legs or tines 32 will be depending downwardly substantially transversely or at right angles, to the main plane of the blade 22 while the other leg or tine 34 will extend across the width of the blade. By locating the latter leg or tine 34 beneath the tab 40, the thatching device 24 will be securely held in place. The construction of the tab 40, notch 36 and tongue 38 has been known and used with a single thatching tine in connection with a non-cutting bar used for thatching only. In operation the active leg or tine 32 will provide the thatching action with the coiled body portion 30 providing resilience to inhibit damage to the active leg 32 in the event a hard object is struck.

In the present invention, both tines or legs 32 and 34 can provide the thatching action. In this regard, the length d1 of tine 34 is constructed to be between ½" to ¾" longer than the length d2 of tine 32. In one form of the invention, the length d1 of tine 34 was between around 2" and 2.30" while the length d2 of tine 32 was between around 1.60" inches to around 1.90". As noted, the offset distance d was selected to be less than the blade thickness t to provide for a secure, resilient clamp of the thatching device 24 to the cutting blade 22. Thus the length d2 of tine 32 is generally between around 60% to around 80% of the length d1 of tine 34.

With the combination blade 20, as shown, the tines 34 can be oriented to be depending downwardly for thatching and the tines 32 will be used to secure the thatching devices 24 to the cutting blade 22 via the tabs 40. On the other hand, in order to provide for a lesser distance between the end of the active tine and the cutting edges 26 the position of the tines 32 and 34 can be easily reversed with the tine 32 depending downwardly.

It is believed advantageous to locate the thatching devices 24 at the trailing edges relative to the direction of rotation of the cutting blade 22 and as close to the vanes 28 as possible. Now the thatch, as raked up by the tines 32 or 34, can be readily directed into the air flow path and away from the cutting blade 22.

Depending upon the type of lawn and the desired depth of thatching action or depth of lawn cut, the thatching devices 24 can be easily removed and reversed to selectively vary the distance between the bottom of the working tines 32 or 34 and the cutting edges 26. In this way various types of lawns and seasonal variations in depth of cut can be more readily accommodated.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A combination cutting blade for a rotary lawn mower with the combination comprising:

an elongated, generally flat cutting blade having cutting surfaces at alternate end edges, said cutting blade having upwardly extending vanes on end edges opposite said alternate end edges, said vanes extending upwardly at an angle of between 45° to 50° with the plane of the remainder of said cutting blade, said cutting surfaces and said vanes extending from the blade ends of said cutting blade for between 30% to 40% of the distance from said blade ends to the midpoint of said cutting blade, thatching devices located at opposite end portions of said cutting blade proximate to said cutting surfaces, each of said thatching devices having a coiled body portion terminating at opposite ends in generally radially extending leg portions, securing means being selectively operable with one of said leg portions for holding said thatching devices to said cutting blade with the other one of said leg portions depending downwardly from said cutting blade to provide a thatching action, said securing means being alternately selectively operable with the other of said leg portions for holding said thatching devices to said cutting blade with said one of said leg portions depending downwardly from said cutting blade to provide a thatching action, said securing means including tongues formed along the same edges as said vanes and located proximate to said vanes in a generally flat portion of said cutting blade, said securing means including an upwardly extending tab located intermediate the opposite edges of said blade and generally in alignment with said tongues width wise of the blade, said leg portions extending generally in quadrature with each other with each being radially offset from the axis of said coiled body portion of a distance no greater than the thickness of said cutting blade in the area of said tongues and said tabs, said coiled body portion adapted to be moved onto said tongue in a clearance relationship with said one or other of said leg portions located beneath said tab and with the remaining one of said one or said other of said leg portions depending downwardly, said one leg portion being substantially longer than said other leg portion whereby the distance between said cutting surfaces and the active thatching extremities of said thatching devices can be selectively varied by securing said thatching devices with said one or said other of said leg portions depending downwardly for thatching action, said other of said leg portions having a length of between 1.60 inches to 1.90 inches, said one leg portion being between ½ inch to ¾ inch longer than said other leg portion, whereby a lawn can be cut to a desired height and simultaneously thatched to a desired depth.

2. A combination cutting blade for a rotary lawn mower with the combination comprising:

an elongated, generally flat cutting blade having cutting surfaces at alternate end edges, said cutting blade having upwardly extending vanes on end edges opposite said alternate end edges, said vanes extending upwardly at an angle of between 45° to 50° with the plane of the remainder of said cutting blade, thatching devices located at opposite end portions of said cutting blade proximate to said cutting surfaces, each of said thatching devices having a coiled body portion terminating at opposite ends in generally radially extending leg portions, securing means being selectively operable with one of said leg portions for holding said thatching devices to said cutting blade with the other one of said leg portions depending downwardly from said cutting blade to provide a thatching action, said securing means being alternately selectively operable with the other of said leg portions for holding said thatching devices to said cutting blade with said one of said leg portions depending downwardly from said cutting blade to provide a thatching action, said securing means including tongues formed along the same edges as said vanes and located proximate to said vanes in a generally flat portion of said cutting blade, said securing means including an upwardly extending tab located intermediate the opposite edges of said blade and generally in alignment with said tongues width wise of the blade, said leg portions extending generally in quadrature with each other with each being radially offset from the axis of said coiled body portion of a distance no greater than the thickness of said cutting blade in the area of said tongues and said tabs, said coiled body portion adapted to be moved onto said tongue in a clearance relationship with said one or other of said leg portions located beneath said tab and with the remaining one of said one of said other of said leg portions depending downwardly, said one leg portion being substantially longer than said other leg portion whereby the distance between said cutting surfaces and the active thatching extremities of said thatching devices can be selectively varied by securing said thatching devices with said one or said other of said leg portions depending downwardly for thatching action, said other of said leg portions having a length of between 1.60 inches to 1.90 inches, said one leg portion being between ½ inch to ¾ inch longer than said other leg portion, whereby a lawn can be cut to a desired height and simultaneously thatched to a desired depth.

3. A combination cutting blade for a rotary lawn mower with the combination comprising:

an elongated, generally flat cutting blade having cutting surfaces at alternate end edges, said cutting blade having upwardly extending vanes on end edges opposite said alternate end edges, thatching devices located at opposite end portions of said cutting blade proximate to said cutting surfaces, each of said thatching devices having a coiled body portion terminating at opposite ends in generally radially extending leg portions, securing means being selectively operable with one of said leg portions for holding said thatching devices to said cutting blade with the other one of said leg portions depending downwardly from said cutting blade to provide a thatching action, said securing means being alternately selectively operable with the other of said leg portions for holding said thatching devices to said cutting blade with said one of said leg portions depending downwardly from said cutting blade to provide a thatching action, said securing means including tongues formed along the same edges as said vanes and located proximate to said vanes in a generally flat portion of said cutting blade, said securing means including a tab located intermediate the opposite edges of said blade and generally in alignment with said tongues width wise of the blade, said leg portions extending generally in quadrature with each other with each being radially offset from the axis of said coiled body portion of a distance no greater than around the thickness of said cutting blade in the area of said tongues and said tabs, said coiled body portion adapted to be moved onto said tongue in a clearance relationship with said one or other of said leg portions located beneath said tab and with the remaining one of said one or said other of said leg portions depending downwardly, said one leg portion being substantially longer than said other leg portion whereby the distance between said cutting surfaces and the active thatching extremities of said thatching devices can be selectively varied by securing said thatching devices with said one or said other of said leg portions depending downwardly for thatching action, said other of said leg portions having a length of between 1.60 inches to 1.90 inches, said one leg portion being between ½ inch to ¾ inch longer than said other leg portion, whereby a lawn can be cut to a desired height and simultaneously thatched to a desired depth.

4. A combination cutting blade for a rotary lawn mower with the combination comprising:

an elongated, generally flat cutting blade having cutting surfaces at alternate end edges, said cutting blade having upwardly extending vanes on end edges opposite said alternate end edges, thatching devices located at opposite end portions of said cutting blade proximate to said cutting surfaces, each of said thatching devices having a coiled body portion terminating at opposite ends in generally radially extending leg portions, securing means being selectively operable with one of said leg portions for holding said thatching devices to said cutting blade with the other one of said leg portions depending downwardly from said cutting blade to provide a thatching action, said securing means being alternately selectively operable with the other of said leg portions for holding said thatching devices to said cutting blade with said one of said leg portions depending downwardly from said cutting blade to provide a thatching action, said securing means including tongue members located proximate to said vanes, said securing means including a tab located and generally in alignment with said tongues, said leg portions extending generally in quadrature with each other, said coiled body portion adapted to be moved onto said tongue in a clearance relationship with said one or other of said leg portions located beneath said tab and with the remaining one of said one or said other of said leg portions depending downwardly, said one leg portion being substantially longer than said other leg portion whereby the distance between said cutting surfaces and the active thatching extremities of said thatching devices can be selectively varied by securing said thatching devices with said one or said other of said leg portions depending downwardly for thatching action, said other leg portion being generally between 60% to 80% of the length of said one leg portion, whereby a lawn can be cut to a desired height and simultaneously thatched to a desired depth.

5. A combination cutting blade for a rotary lawn mower with the combination comprising:

an elongated, generally flat cutting blade having cutting surfaces at alternate end edges, thatching devices located at opposite end portions on said cutting blade proximate to said cutting surfaces, each of said thatching devices having a coiled body portion terminating at opposite ends in generally radially extending leg portions, securing means being selectively operable with one of said leg portions for holding said thatching devices to said cutting blade with the other one of said leg portions depending downwardly from said cutting blade to provide a thatching action, said securing means being alternately selectively operable with the other of said leg portions for holding said thatching devices to said cutting blade with said one of said leg portions depending downwardly from said cutting blade to provide a thatching action, said one leg portion being substantially longer than said other leg portion whereby the distance between said cutting surfaces and the active thatching extremities of said thatching devices can be selectively varied by securing said thatching devices with said one or said other of said leg portions depending downwardly for thatching action, said other of said leg portions having a length of between 1.60 inches to 1.90 inches, said one leg portion being between ½ inch to ¾ inch longer than said other leg portion, whereby a lawn can be cut to a desired height and simultaneously thatched to a desired depth.

6. The combination of claim 5 with said other leg portion having a length from 60% to 80% of the length of said one leg portion.

7. A combination cutting blade for a rotary lawn mower with the combination comprising:

an elongated, generally flat cutting blade having cutting surfaces at alternate end edges, said cutting blade having upwardly extending vanes on end edges opposite said alternate end edges, said vanes extending upwardly at an angle of between 45° to 50° with the plane of the remainder of said cutting blade, said cutting surfaces and said vanes extending inwardly from the blade ends of said cutting blade for between 30% to 40% of the distance from said blade ends to the midpoint of said cutting blade, thatching devices located at opposite end portions of said cutting blade proximate to said cutting surfaces at a location past the inwardmost extremity of said vanes, each of said thatching devices having a coiled body portion terminating at opposite ends in generally radially extending leg portions, securing means being selectively operable with one of said leg portions for holding said thatching devices to said cutting blade with the other one of said leg portions depending downwardly from said cutting blade to provide a thatching action, said securing means including tongues formed along the same edges as said vanes and located proximate to said vanes in a generally flat portion of said cutting blade, said securing means including a tab extending outwardly from the plane of said cutting blade and located intermediate the opposite edges of said blade and generally in alignment with said tongues width wise of the blade, said coiled body portion adapted to be moved onto said tongue in a clearance relationship with said one of said leg portions located beneath said tab and with said other of said leg portions depending downwardly.

8. The combination cutting blade for a rotary lawn mower of claim 7 with said leg portions extending generally in quadrature with each other with at least said one of said leg portions being radially offset from the axis of said coiled body portion a distance no greater than the thickness of said cutting blade in the area of said tongues and said tabs.

* * * * *